July 30, 1968     W. H. STRUBE, SR     3,394,947

AUTOMOBILE CAMPER STEP CONSTRUCTION

Filed Sept. 26, 1966

WILLIAM H. STRUBE, SR.
INVENTOR.

BY
*Alan B. McClehee*
ATTORNEY

3,394,947
AUTOMOBILE CAMPER STEP CONSTRUCTION
William H. Strube, Sr., 11304 Linden,
Lynwood, Calif. 90262
Filed Sept. 26, 1966, Ser. No. 581,950
4 Claims. (Cl. 280—166)

ABSTRACT OF THE DISCLOSURE

Collapsible steps for automobile campers including a pair of steps and a riser between them. The upper step being pivotally secured to the upper forward portion of a rear camper vehicle, the upper step resting upon the flat upper surface of the bumper, the riser having a portion thereof braced by the vertical rear edge of the bumper and the steps and riser being swingable upwardly and forwardly to a vertically stacked position resting on the bumper. The collapsed or stacked steps are arranged to permit access to a trailer hitch ball located in a well in the rear central portion of the bumper.

Disclosure

This invention relates to a step construction for automobile campers.

Camper bodies customarily are placed upon motor trucks of the "pick-up" type. These trucks conventionally have rear bumpers which extend across the vehicle in the usual manner and are relatively wide and flat across the top, the flat top serving as a step to facilitate entry into the truck body when it is used without the camper body.

When a camper body is mounted on the truck, the wide flat bumper can still be used as a step, but it is of much greater height than a normal stairway step, and ingress to and egress from the camper body is inconvenient and difficult.

In many cases, the bumper of such a vehicle is provided with a recess extending downwardly from the flat upper surface at the rear central portion of the bumper to receive a trailer hitch ball element which is securely mounted in the well or recess.

It is an object of the invention to provide a camper step construction which can be secured to the bumper in a manner which will facilitate entry into the camper body and which, when not in use, can be folded or collapsed on the top of the bumper, preferably toward the forward edge thereof so that the trailer hitch ball is exposed for use in pulling a trailer with the vehicle upon which the camper body is mounted.

The above and other objects of the invention will more fully appear from the following description in connection with the accompanying drawing.

Figures 1, 2:
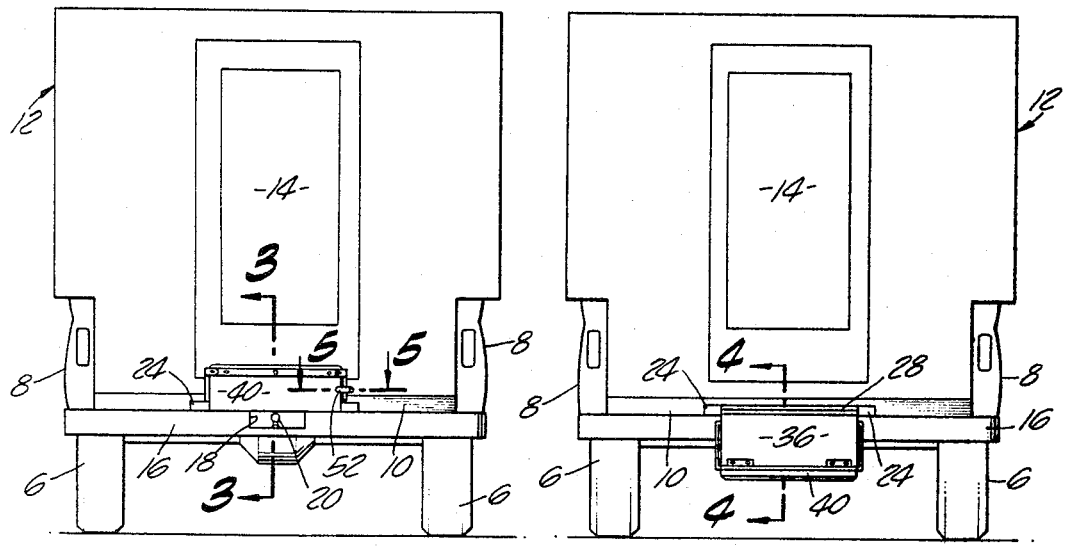
FIG. 1 is a rear elevational view of a camper type vehicle with my step unit shown in its collapsed or folded position.
FIG. 2 is a view similar to FIG. 1, with the step unit unfolded and in position for use.

There is illustrated a motor vehicle of the "pick-up" type having rear wheels 6 and side walls 8 which are the sides of a conventional pick-up truck. These extend upwardly from a bed 10. A camper body is illustrated generally at 12, and is provided with a rear entrance door 14. Extending across the rear of the vehicle is a bumper 16 having a recess 18 in which is mounted a trailer hitch ball 20. Suitably secured, as by welding to the flat upper surface 22 of the bumper 16 are spaced hinge straps 24. Extending between them and rotatable in the rolled portions of said hinge straps is a hinge or pivot shaft 26 secured by any suitable means to an upper horizontal member 28 which may be provided with a friction surface 30 and which serves as a top step for the step unit or assembly. The member 28 can be swung from the vertical position of FIG. 3 to the horizontal position of FIG. 4.

On the rearward under surface of the member 28 is a hinge element 32 pivotally connected to a hinge element 34 on the upper forwardly facing surface of a step riser 36. The step riser at its lower edge is connected by a hinge 38 to the forward edge of a step 40, said step having a friction surface material 42 of any suitable type.

Figures 3, 4:
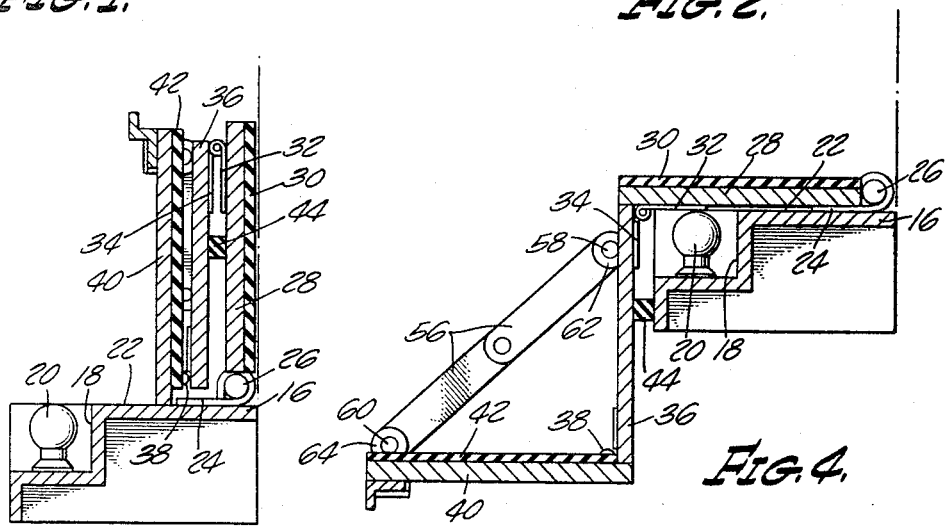
FIG. 3 is an enlarged sectional view taken on line 3—3 of FIG. 1.
FIG. 4 is an enlarged sectional view taken on the line 4—4 of FIG. 2.
Figure 5:
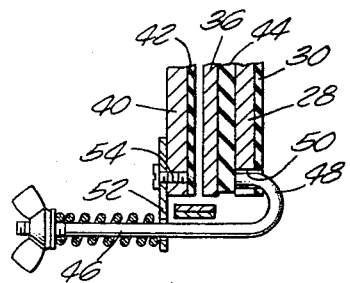
FIG. 5 is an enlarged sectional detail taken on the line 5—5 of FIG. 1.

On the inner or forward facing surface of the riser 36 is a resilient bumper 44, which in the position of FIG. 4, rests against the vertical rear surface of the bumper 16. In the collapsed position of FIG. 3, the bumper 44 lies between the upper horizontal member 28 and the riser 36. The unit is held in its collapsed position by means of a spring hook 46 whose curved end 48 is removably receivable in a socket 50 formed in one end of the upper horizontal member 28. The spring-loaded hook 46 is carried by and movable through an apertured lug 52 secured by a bolt 54 to the underside of the step 40. The spring-loaded bolt 46 can also be rotated so that when it is pushed to the right as viewed in FIG. 5, said bolt can be turned to bring its curved end 48 away from the upper horizontal member 28 and permit the step unit to be unfolded to the position of FIG. 4.

The step 40 is secured by a pair of jack knife braces 56 whose upper and lower ends are connected respectively by means of pivots 58 and 60 to lugs 62 and 64 on upper portions of the riser 36 and rearward portions of the step 40.

As shown in FIGS. 2 and 4, when the step unit is unfolded, the step 40 is positioned considerably lower than the top of the bumper 16, so that the user of the camper can conveniently ascend and descend to and from the entrance provided by the door 14. When the step unit is not in use it is folded to the positions of FIGS. 1 and 3 and held in that position by the spring-loaded bolt 46 shown in FIG. 5. In the collapsed position, the resilient element 44, in addition to the spring on the bolt 46, hold the step unit against undue movement and rattle.

As clearly indicated in FIG. 3, when the step unit is collapsed on the upper forward portion of the bumper 16, the trailer hitch bolt 20 is unobstructed, and a trailer may be connected thereto. It should be understood that various changes can be made in the forms, details, arrangement, and proportions of the various parts without departing from the spirit of the invention.

I claim:

1. A folding step unit for an automobile camper having a rear bumper with a rear vertical face comprising a horizontal member comprising an upper step having pivot means for connecting with the forward upper portion of the bumper, said horizontal upper step member having a width to rest upon and span the width of the bumper, a riser pivoted to said horizontal member and extending downwardly from its rear portion and having a vertical portion positioned to engage the rear vertical face of the bumper, a horizontal lower step member having a forward edge pivotally connected to the lower edge of said riser, said horizontal upper step member being swingable forwardly and upwardly, said riser being then swingable against the horizontal upper member, and said lower step member being swingable against said riser whereby the step unit can be vertically stacked on the bumper when not in use.

2. The structure in claim 1, and a collapsible brace connecting the said riser and said lower step member.

3. The structure in claim 1, and releasable catch means for securing said horizontal upper step member, riser and lower step in other collapsed positions.

4. The structure in claim 1, and said rear bumper having a relatively flat upper surface with a trailer hitch well having a trailer hitch therein below said flat upper surface and said horizontal upper step member in the position of use of said step unit overlying said wheel and trailer hitch, and in its collapsed position, the horizontal upper step member, riser and lower step being disposed forwardly of said well and trailer hitch to expose the trailer hitch for use.

References Cited

UNITED STATES PATENTS

| | | | |
|---|---|---|---|
| 63,458 | 4/1867 | Baker | 280—166 |
| 609,136 | 8/1898 | Bickelberger | 105—448 |
| 2,492,914 | 12/1949 | Barden | 280—163 |
| 3,330,577 | 7/1967 | Mills | 280—166 |

BENJAMIN HERSH, *Primary Examiner.*

J. SIEGEL, *Assistant Examiner.*